(12) United States Patent
Hong et al.

(10) Patent No.: US 11,840,125 B2
(45) Date of Patent: Dec. 12, 2023

(54) METHOD FOR CONTROLLING HVAC SYSTEM

(71) Applicants: Hyundai Motor Company, Seoul (KR); Kia Corporation, Seoul (KR)

(72) Inventors: Gyu Sik Hong, Yongin-si (KR); Jun Ho Song, Hwaseong-si (KR); Seo Jung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 45 days.

(21) Appl. No.: 17/397,602

(22) Filed: Aug. 9, 2021

(65) Prior Publication Data
US 2022/0176781 A1 Jun. 9, 2022

(30) Foreign Application Priority Data
Dec. 8, 2020 (KR) .................. 10-2020-0170574

(51) Int. Cl.
*B60H 1/00* (2006.01)
(52) U.S. Cl.
CPC ..... *B60H 1/00849* (2013.01); *B60H 1/00764* (2013.01); *B60H 1/00828* (2013.01); *B60H 1/00842* (2013.01)
(58) Field of Classification Search
CPC ............ B60H 1/00778; B60H 1/00828; B60H 1/00864; B60H 1/00849; B60H 1/00642; B60H 1/00735; B60H 1/00821; B60H 1/00835; B60H 1/3208; B60H 1/322; B60H 1/00764; B60H 2001/3238; B60H 2001/3273; B60H 2001/3241; F25B 49/022; F25B 49/02; F25B 2600/02; F25B 2600/0251
See application file for complete search history.

(56) References Cited

U.S. PATENT DOCUMENTS

| | | | | |
|---|---|---|---|---|
| 6,729,998 | B2 * | 5/2004 | Egami | F02N 11/04 62/133 |
| 2001/0015070 | A1 * | 8/2001 | Hara | B60L 1/02 62/133 |
| 2002/0036081 | A1 * | 3/2002 | Ito | B60H 1/00835 165/202 |
| 2003/0118450 | A1 * | 6/2003 | Iwanami | F04B 27/0895 417/15 |
| 2004/0079098 | A1 * | 4/2004 | Uno | F25B 27/00 62/323.3 |

(Continued)

FOREIGN PATENT DOCUMENTS

| | | | | |
|---|---|---|---|---|
| DE | 19804034 A1 * | 8/1998 | ......... | B60H 1/00849 |
| KR | 100802838 B1 * | 2/2008 | | |

(Continued)

*Primary Examiner* — Jenna M Hopkins
(74) *Attorney, Agent, or Firm* — MORGAN, LEWIS & BOCKIUS LLP (57) ABSTRACT

A method for controlling a heating, ventilation, and air conditioning (HVAC) system, may include: allowing, by a controller, only the indoor air to be directed into a housing when the HVAC system operates in a cooling mode and an engine is stopped by an Idle Stop and Go (ISG) system; allowing, by the controller, the indoor air directed into the housing to bypass a heater core; and maintaining, by the controller, a flow rate of the air directed into the housing at a minimum flow rate.

11 Claims, 4 Drawing Sheets

(56) References Cited

U.S. PATENT DOCUMENTS

| | | | | |
|---|---|---|---|---|
| 2006/0053815 | A1* | 3/2006 | Naruse | B60H 1/00849 |
| | | | | 62/186 |
| 2006/0117775 | A1* | 6/2006 | Dage | B60H 1/004 |
| | | | | 62/230 |
| 2008/0041078 | A1* | 2/2008 | Choi | B60H 1/322 |
| | | | | 62/186 |
| 2012/0152512 | A1* | 6/2012 | Mori | B60H 1/00864 |
| | | | | 165/202 |
| 2013/0098090 | A1* | 4/2013 | Mori | B60H 1/00778 |
| | | | | 165/41 |
| 2018/0319244 | A1* | 11/2018 | Yamada | B60H 1/005 |
| 2020/0130463 | A1* | 4/2020 | Moore | B60H 1/00857 |

FOREIGN PATENT DOCUMENTS

| | | | | | |
|---|---|---|---|---|---|
| KR | 20090056467 | A | * | 6/2009 | |
| KR | 20090112836 | A | * | 10/2009 | |
| KR | 20130093236 | A | * | 8/2013 | |
| KR | 20220055314 | A | * | 5/2022 | |
| WO | WO-0119629 | A1 | * | 3/2001 | B60H 1/3205 |
| WO | WO-2014002610 | A1 | * | 1/2014 | B60H 1/00764 |

* cited by examiner

METHOD FOR CONTROLLING HVAC SYSTEM

CROSS-REFERENCE TO RELATED APPLICATION

The present application claims priority to Korean Patent Application No. 10-2020-0170574, filed on Dec. 8, 2020, in the Korean Intellectual Property Office, the entire contents of which is incorporated herein for all purposes by this reference.

BACKGROUND OF THE PRESENT INVENTION

Field of the Invention

The present invention relates to a method for controlling a heating, ventilation, and air conditioning (HVAC) system, and more particularly, to a method for controlling an HVAC system configured for stably maintaining an engine stop time by preventing a temperature of an evaporator in the HVAC system from rapidly rising when the HVAC system is operating in a cooling mode and the engine is stopped by an Idle Stop and Go (ISG) system.

Description of Related Art

An Idle Stop and Go (ISG) system is configured to automatically shut down and restart the engine when the vehicle is temporarily stopped (a standstill) for a predetermined time period due to waiting at traffic lights, traffic jams, etc., reducing fuel consumption and emissions.

A compressor of a heating, ventilation, and air conditioning (HVAC) system is operated by the engine through an accessory belt, when the ISG system stops the engine in a state in which operated the HVAC system is operating in a cooling mode, the compressor of the HVAC system stops due to the engine stop and a refrigerant cannot circulate in the HVAC system, so a cooling operation time of the HVAC system is kept relatively short. This causes the temperature of an evaporator to rise excessively, and accordingly the engine is automatically restarted by the ISG system to maintain a cooling requirement temperature. That is, while the vehicle is temporarily at a standstill, a stop time (e.g., 25 seconds) of the engine stopped by the ISG system is relatively short, so a fuel efficiency improvement effect achieved by the ISG system is relatively reduced.

To cope with this, a technique of applying a cold storage medium to the evaporator is being researched and developed. When the engine is stopped by the ISG system during the turn-on of the HVAC system for the cooling operation, the cold storage medium keeps the temperature of the evaporator constant, so that the engine stop time obtained by the ISG system may be kept constant.

However, when the cold storage medium is applied to the evaporator, the manufacturing cost and the size of the HVAC system may increase. Furthermore, when the engine operates, cooling performance may be reduced by the cold storage medium.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method for controlling a heating, ventilation, and air conditioning (HVAC) system configured for stably maintaining an engine stop time by preventing a temperature of an evaporator from rapidly rising when the HVAC system is operating in a cooling mode and the engine is stopped by an Idle Stop and Go (ISG) system.

According to various aspects of the present invention, a method for controlling an HVAC system including a housing having an outdoor air inlet through which outdoor air is allowed to draw in and an indoor air inlet through which indoor air of a vehicle is allowed to draw in, an inlet door for opening or closing the outdoor air inlet and the indoor air inlet, an evaporator, a heater-side passage and a bypass passage formed in parallel in the housing on the downstream of the evaporator, a heater core mounted within the heater-side passage, a temperature door pivotally mounted between the heater-side passage and the bypass passage and opening or closing the heater-side passage and the bypass passage, and an air blower blowing the air into the housing, may include: allowing, by a controller, only the indoor air to be directed into the housing when the HVAC system operates in a cooling mode and an engine is stopped by an Idle Stop and Go (ISG) system; allowing, by the controller, the indoor air directed into the housing to bypass the heater core, by controlling the temperature door; and maintaining, by the controller, a flow rate of the air directed into the housing at a minimum flow rate.

The controller may allow only the indoor air to be directed into the housing by controlling the inlet door to fully close the outdoor air inlet and fully open the indoor air inlet when the controller determines that the outdoor air is directed into the housing.

The HVAC system may further include a first actuator which is configured to operate the inlet door. The inlet door may move between a first open position in which the outdoor air inlet is fully opened and the indoor air inlet is fully closed and a second open position in which the outdoor air inlet is fully closed and the indoor air inlet is fully opened. When a first voltage applied to the first actuator is a first minimum voltage, the inlet door may move to the first open position, and when the first voltage is a first maximum voltage, the inlet door may move to the second open position.

The controller may set the first voltage to the first maximum voltage when the first voltage is higher than or equal to the first minimum voltage and lower than the first maximum voltage.

The controller may allow the indoor air directed into the housing to bypass the heater core by controlling the temperature door to fully open the bypass passage and fully close the heater-side passage when it is determined that at least a portion of the heater-side passage is opened.

The HVAC system may further include a second actuator which is configured to operate the temperature door. The temperature door may move between a first operating position in which the heater-side passage is fully closed and the bypass passage is fully opened and a second operating position in which the heater-side passage is fully opened and the bypass passage is fully closed. When a second voltage applied to the second actuator is a second minimum voltage, the temperature door may move to the first operating position, and when the second voltage is a second maximum voltage, the temperature door may move to the second operating position.

The controller may set the second voltage to the second minimum voltage when the second voltage is higher than the second minimum voltage and lower than or equal to the second maximum voltage.

The controller may set the flow rate of the air blown by the air blower to the minimum flow rate when the controller determines that the flow rate of the air blown by the air blower is higher than or equal to a reference flow rate, the reference flow rate may be an air flow rate allowing a temperature of the evaporator to rise to a limit temperature within a reference time when a compressor is stopped, and the limit temperature may be a temperature of the evaporator allowing the engine to be restarted by the ISG system.

The flow rate of the air blown into the housing by the air blower may become a minimum flow rate when a third voltage applied to the air blower is a third minimum voltage, and the flow rate of the air blown into the housing by the air blower may become a maximum flow rate when the third voltage is a third maximum voltage.

The controller may be configured to determine whether the third voltage is higher than or equal to a reference voltage. When the controller concludes that the third voltage is higher than or equal to the reference voltage, the controller may subtract a predetermined voltage from the third voltage until the third voltage is set to the third minimum voltage, and the reference voltage may be a voltage corresponding to the reference flow rate.

The controller may set the third voltage to the third minimum voltage when the third voltage is higher than or equal to the third minimum voltage and lower than the reference voltage.

The method may further include: setting, by the controller, a duty cycle of a compressor to 100% for a predetermined time period when receiving a stop signal of the engine from the ISG system; and controlling, by the controller, the ISG system to stop the engine.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
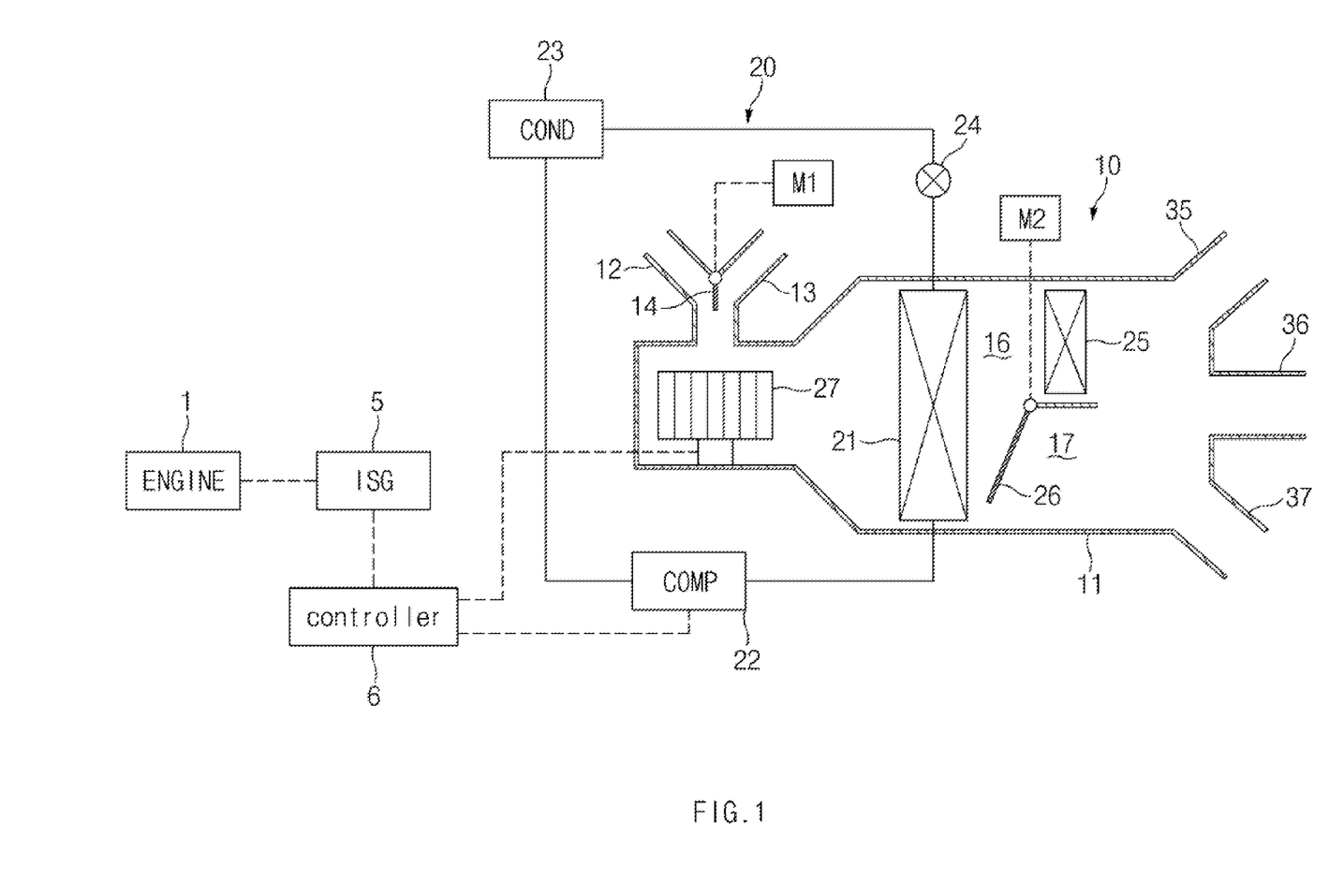
FIG. 1 illustrates a block diagram of the connection of an Idle Stop and Go (ISG) system to a vehicle heating, ventilation, and air conditioning (HVAC) system according to various exemplary embodiments of the present invention.

Referring to FIG. 1, a heating, ventilation, and air conditioning (HVAC) system 10 according to various exemplary embodiments of the present invention may include a housing 11, in which an evaporator 21, a heater core 25, and a temperature door 26 are contained. The evaporator 21, the temperature door 26, and the heater core 25 may be sequentially disposed within the housing 11 in an air flow direction from upstream to downstream.

The housing 11 may include two inlets 12 and 13 through which the air is allowed to draw in, and a plurality of outlets 35, 36, and 37 through which the air is directed into a passenger compartment.

The two inlets 12 and 13 may include an outdoor air inlet 12 through which the outdoor air is allowed to draw in, and an indoor air inlet 13 through which the indoor air in the passenger compartment is allowed to draw in. An inlet door 14 may open or close the outdoor air inlet 12 and the indoor air inlet 13. The inlet door 14 may be rotatably mounted between the outdoor air inlet 12 and the indoor air inlet 13. As the inlet door 14 rotates, the opening amount of the outdoor air inlet 12 and the opening amount of the indoor air inlet 13 may be adjusted relative to each other. According to various exemplary embodiments of the present invention, the inlet door 14 may move between a first open position and a second open position. The first open position refers to a position in which the inlet door 14 completely covers the indoor air inlet 13 so that the outdoor air inlet 12 may be fully opened and the indoor air inlet 13 may be fully closed. When the inlet door 14 is in the first open position, the opening amount of the outdoor air inlet 12 may be 100%, and the opening amount of the indoor air inlet 13 may be 0%. The second open position refers to a position in which the inlet door 14 completely covers the outdoor air inlet 12 so that the outdoor air inlet 12 may be fully closed and the indoor air inlet 13 may be fully opened. When the inlet door 14 is in the second open position, the opening amount of the outdoor air inlet 12 may be 0%, and the opening amount of the indoor air inlet 13 may be 100%.

The inlet door 14 may be operated by a first actuator M1. By applying a first voltage $V_1$ in a predetermined range (e.g., 0.3V-4.6V) to the first actuator M1, the inlet door 14 may move continuously between the first open position and the second open position. According to various exemplary embodiments of the present invention, when the first voltage $V_1$ applied to the first actuator M1 is a first minimum voltage $V_{min1}$ ($V_1=V_{min1}$), the inlet door 14 may move to the first open position so that only the outdoor air may be directed into the housing 11 through the outdoor air inlet 12. When the first voltage $V_1$ applied to the first actuator M1 is a first maximum voltage $V_{max1}$ ($V_1=V_{max1}$), the inlet door 14 may move to the second open position so that only the indoor air may be directed into the housing 11 through the indoor air inlet 13. When the first voltage $V_1$ applied to the first actuator M1 is higher than or equal to the first minimum voltage $V_{min1}$ and lower than the first maximum voltage $V_{max1}$ ($V_{min1} \leq V_1 < V_{max1}$), the inlet door 14 may rotate at a predetermined angle between the indoor air inlet 13 and the outdoor air inlet 12 depending on the level of the applied voltage, so that the opening amount of the outdoor air inlet 12 and the opening amount of the indoor air inlet 13 may be adjusted relative to each other. Thus, the outdoor air inlet 12 and the indoor air inlet 13 may be at least partially opened. For example, the first minimum voltage may be 0.3V, and the first maximum voltage may be 4.6V.

According to various exemplary embodiments of the present invention, the plurality of outlets 35, 36, and 37 may include a defrost vent outlet 35, a face vent outlet 36, and a foot vent outlet 37.

When the HVAC system 10 operates in an air conditioning mode (e.g., a cooling mode, a heating mode, etc.), the evaporator 21 and the heater core 25 may be arranged in a forward flow direction of the air flowing from the two inlets 12 and 13 to the plurality of outlets 35, 36, and 37. That is, the heater core 25 may be located downstream of the evaporator 21 in the forward flow direction of the air.

The evaporator 21 may be located upstream in the housing 11. The evaporator 21 may be disposed adjacent to the inlets 12 and 13 of the housing 11. The evaporator 21 may be disposed adjacent to an air blower 27 in the housing 11, and the evaporator 21 may be configured to cool the air directly blown by the rotation of the air blower 27. According to various exemplary embodiments of the present invention, the evaporator 21 may form a refrigeration cycle 20 together with a compressor 22, a condenser 23, and an expansion valve 24, and the evaporator 21 may be configured to cool the air using a refrigerant circulated by the operation of the refrigeration cycle.

The heater core 25 may be located downstream of the evaporator 21, and the heater core 25 may be disposed adjacent to the plurality of outlets 35, 36, and 37. The heater core 25 may be configured to heat the air. According to various exemplary embodiments of the present invention, the heater core 25 may be configured to heat the air using an engine coolant heated by an engine. According to another exemplary embodiment of the present invention, waste heat generated when electric/electronic components, such as a motor, power converters (an inverter, a converter, etc.), an on-board charger (OBC), and an autonomous driving controller, are operating may heat a coolant, and the heater core 25 may be configured to heat the air using the coolant heated by the waste heat. According to another exemplary embodiment of the present invention, the heater core 25 may be configured to heat the air using a refrigerant compressed by the heating operation (heat pump function) of the refrigeration cycle.

A heater-side passage 16 and a bypass passage 17 may be disposed in parallel on the downstream of the evaporator 21. The heater core 25 may be located within the heater-side passage 16, and the bypass passage 17 may be disposed in parallel to the heater-side passage 16. The temperature door 26 may open or close the heater-side passage 16 and the bypass passage 17. The temperature door 26 may be rotatably mounted between the heater-side passage 16 and the bypass passage 17, and the opening amount of the heater-side passage 16 and the opening amount of the bypass passage 17 may be adjusted relative to each other by the rotation of the temperature door 26. For example, the temperature door 26 may move between a first operating position and a second operating position. The first operating position refers to a position in which the heater-side passage 16 is fully closed and the bypass passage 17 is fully opened. When the temperature door 26 is in the first operating position, the opening amount of the heater-side passage 16 may be 0%, and the opening amount of the bypass passage 17 may be 100%. The second operating position refers to a position in which the heater-side passage 16 is fully opened and the bypass passage 17 is fully closed. When the temperature door 26 is in the second operating position, the opening amount of the heater-side passage 16 may be 100%, and the opening amount of the bypass passage 17 may be 0%.

The temperature door 26 may be operated by a second actuator M2. By applying a second voltage $V_2$ in a predetermined range (e.g., 0.3V-4.7V) to the second actuator M2, the temperature door 26 may move between the first operating position and the second operating position. According to various exemplary embodiments of the present invention, when the second voltage $V_2$ applied to the second actuator M2 is a second minimum voltage $V_{min2}$ ($V_2=V_{min2}$), the temperature door 26 may move to the first operating position so that the air (the indoor air or the outdoor air) having passed through the evaporator 21 may only be directed into the bypass passage 17. When the second voltage $V_2$ applied to the second actuator M2 is a second maximum voltage $V_{max2}$ ($V_2=V_{max2}$), the temperature door 26 may move to the second operating position so that the air (the indoor air or the outdoor air) having passed through the evaporator 21 may only be directed into the heater-side passage 16. When the second voltage $V_2$ applied to the second actuator M2 is higher than the second minimum voltage $V_{min2}$ and lower than or equal to the second maximum voltage $V_{max2}$ ($V_{min2} < V_2 \leq V_{max2}$), the temperature door 26 may rotate at a predetermined angle between the heater-side passage 16 and the bypass passage 17 depending on the level of the applied voltage so that the opening amount of the heater-side passage 16 and the opening amount of the bypass passage 17 may be adjusted relative to each other. That is, the heater-side passage 16 and the bypass passage 17 may be at least partially opened. For example, the second minimum voltage $V_{min2}$ may be 0.3V, and the second maximum voltage $V_{max2}$ may be 4.7V.

The air blower 27 may be disposed adjacent to the two inlets 12 and 13, and the outdoor air or the indoor air may be blown into the housing 11 by the operation of the air blower 27. As RPM of the air blower 27 varies, a flow rate of the air blown into the housing 11 may vary. By applying a third voltage $V_3$ in a predetermined range (e.g., 3V-13.5V) to the air blower 27, the RPM of the air blower 27 may vary.

According to various exemplary embodiments of the present invention, the RPM of the air blower 27 may be proportional to the level of the third voltage $V_3$. When the third voltage $V_3$ applied to the air blower 27 increases, the RPM of the air blower 27 may increase. Accordingly, the flow rate of the air blown into the housing 11 by the air blower 27 may increase. When the third voltage $V_3$ applied to the air blower 27 decreases, the RPM of the air blower 27 may decrease. Accordingly, the flow rate of the air blown into the housing 11 by the air blower 27 may decrease. When the third voltage $V_3$ applied to the air blower 27 is a third minimum voltage $V_{min3}$, the RPM of the air blower 27 may be a minimum RPM, and accordingly the flow rate of the air blown into the housing 11 by the air blower 27 may become a minimum flow rate. When the third voltage $V_3$ applied to the air blower 27 is a third maximum voltage $V_{max3}$ ($V_3=V_{max3}$), the RPM of the air blower 27 may be a maximum RPM, and accordingly the flow rate of the air blown into the housing 11 by the air blower 27 may become a maximum air flow rate. For example, the third minimum voltage $V_{min3}$ may be 3V, and the third maximum voltage $V_{max3}$ may be 13.5V.

Referring to FIG. 1, the vehicle HVAC system 10 and the refrigeration cycle 20 may perform an air conditioning operation (e.g., a cooling operation and a heating operation) under the control of a controller 6. The operations of the air blower 27, the compressor 22, the first actuator M1, and the second actuator M2 may be controlled by the controller 6. The controller 6 may include a memory and a processor. When the vehicle is temporarily stopped for a predetermined time period, the engine 1 may be automatically stopped and restarted by an Idle Stop and Go (ISG) system 5. The operation of the ISG system 5 may be controlled by the controller 6.

The compressor 22 may be operated by an accessory belt of the engine, and the air blower 27, the first actuator M1, and the second actuator M2 may be operated with electrical energy supplied from a battery of the vehicle. The controller 6 may adjust a duty cycle of the compressor 22.

Figure 2:
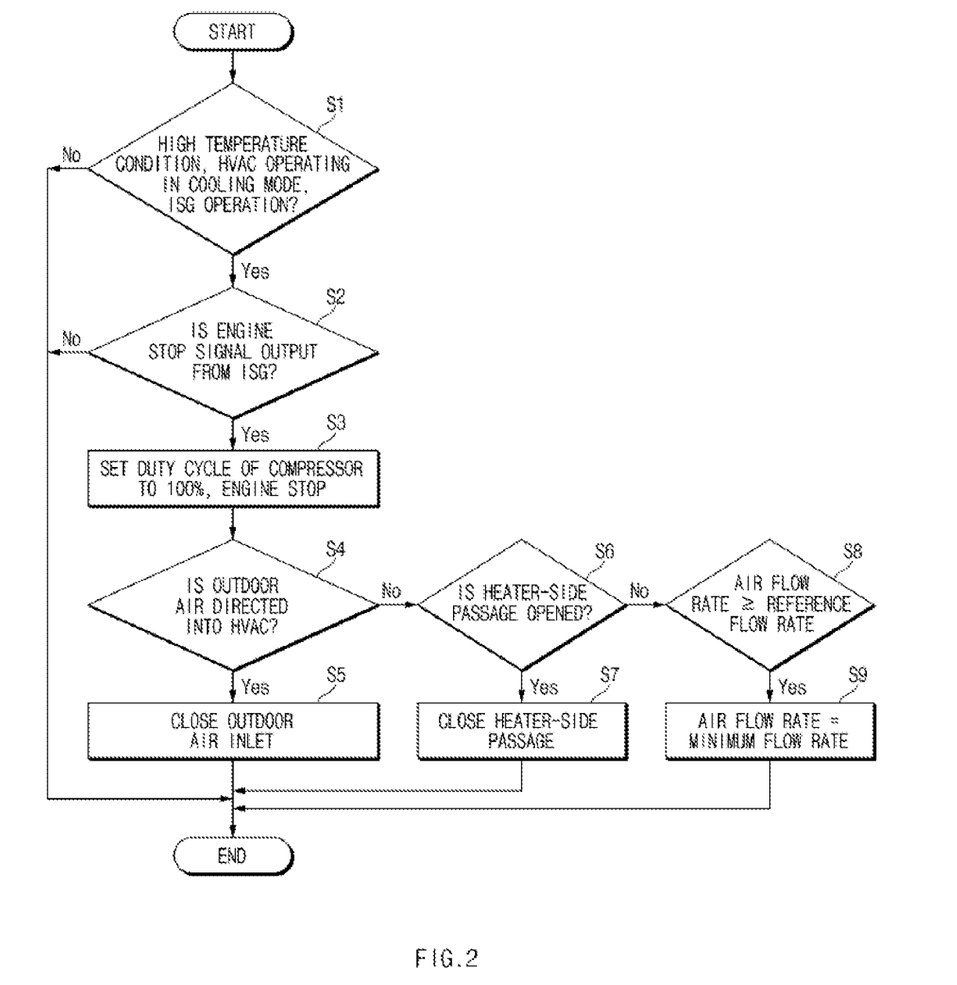
FIG. 2 illustrates a flowchart of a method for controlling a vehicle HVAC system according to various exemplary embodiments of the present invention.

FIG. 2 illustrates a flowchart of a method for controlling a vehicle HVAC system according to various exemplary embodiments of the present invention.

Referring to FIG. 2, the controller 6 may determine whether the outdoor air of the vehicle meets a set high temperature condition, whether the HVAC system 10 performs a cooling operation, and whether the ISG system 5 is in operation (S1). For example, when an outdoor air temperature of the vehicle is within a temperature range of 20° C. to 40° C., the outdoor air condition of the vehicle may be determined as the high temperature condition.

When the outdoor air of the vehicle meets the set high temperature condition, the HVAC system 10 operates in the cooling mode, and the ISG system 5 is operating, the controller 6 may determine whether an engine stop signal is output from the ISG system 5 (S2).

When the controller 6 receives the stop signal of the engine 1 from the ISG system 5, the controller 6 may set the duty cycle of the compressor 22 to 100% for a predetermined time period t (see FIG. 4), and then the controller 6 may control the ISG system 5 to stop the engine 1 (S3). When the engine 1 is stopped, the operation of the compressor 22 operated by the accessory belt of the engine 1 may stop. By keeping the duty cycle of the compressor 22 at 100% for the predetermined time period t, a large amount of compressed refrigerant may be supplied to the evaporator 21 before the stop of the compressor 22, and thus the cooling operation time of the HVAC system 10 may extend as long as possible.

In a state in which the engine 1 is stopped by the ISG system 5, the controller 6 may determine whether the outdoor air is directed into the housing 11 of the HVAC system 10 (S4).

When it is determined that the outdoor air is directed into the housing 11 of the HVAC system 10, the controller 6 may control the first actuator M1 so that the inlet door 14 may fully close the outdoor air inlet 12 and fully open only the indoor air inlet 13 (S5). Accordingly, only the indoor air may be directed into the housing 11 of the HVAC system 10 through the indoor air inlet 13, and the evaporator 21 may contact with the indoor air having a relatively lower temperature than the outdoor air, which prevents a sharp rise in the temperature of the evaporator 21.

Figure 3:
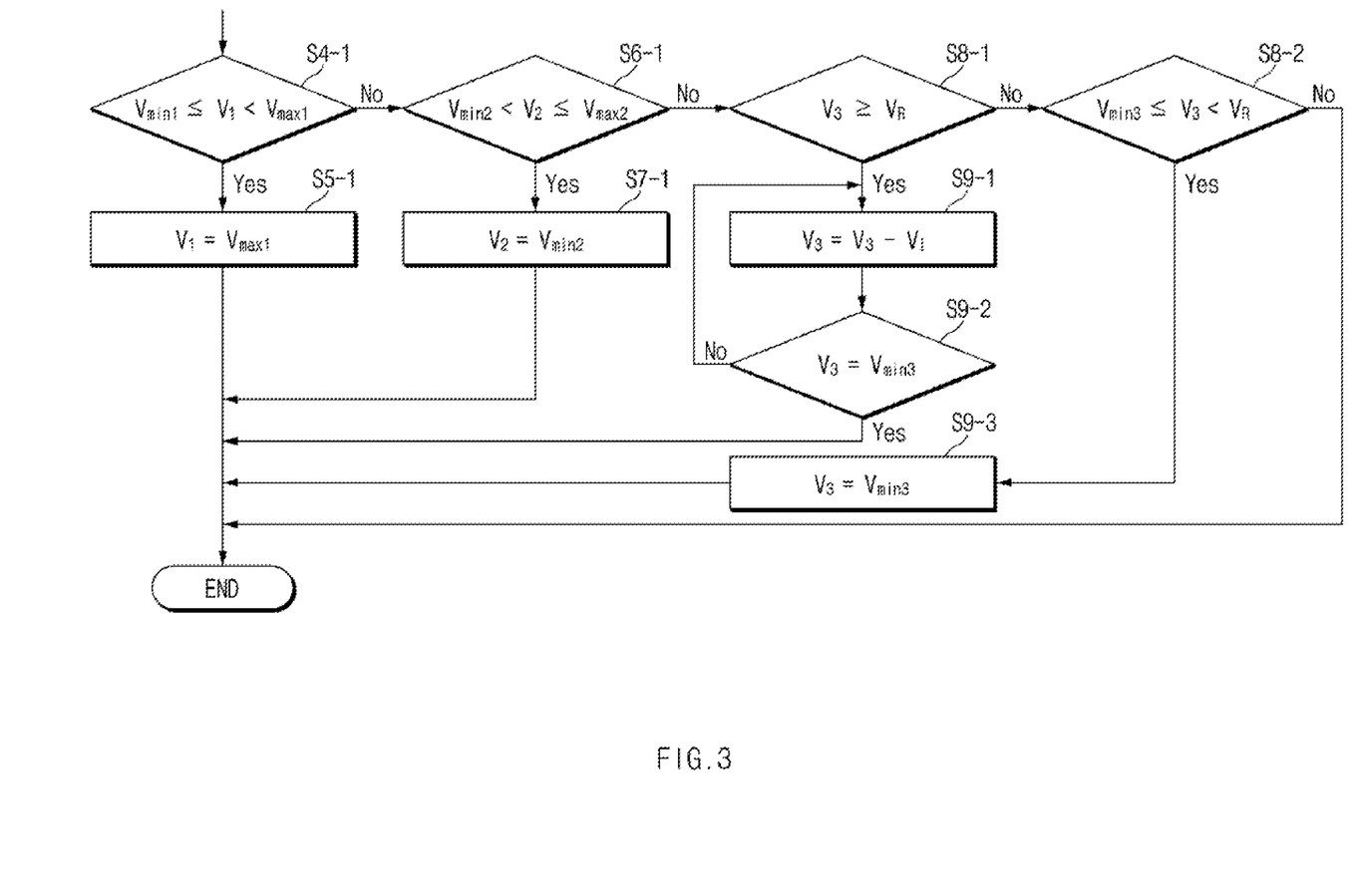
FIG. 3 illustrates a flowchart of a specific example of some steps illustrated in FIG. 2.

Referring to FIG. 3, the controller 6 may determine whether the first voltage $V_1$ applied to the first actuator M1 is higher than or equal to the first minimum voltage $V_{min1}$ and lower than the first maximum voltage $V_{max1}$ ($V_{min1} \leq V_1 < V_{max1}$) (S4-1). When it is determined that the first voltage $V_1$ applied to the first actuator M1 is higher than or equal to the first minimum voltage $V_{min1}$ and lower than the first maximum voltage $V_{max1}$ ($V_{min1} \leq V_1 < V_{max1}$), the controller 6 may set the first voltage $V_1$ to the first maximum voltage $V_{max1}$ (S5-1). Accordingly, as the inlet door 14 moves to the second open position, the outdoor air inlet 12 may be fully closed and the indoor air inlet 13 may be fully opened. Thus, only the indoor air may be directed into the housing 11 through the indoor air inlet 13.

When it is determined that the outdoor air is not directed into the housing 11 of the HVAC system 10, the controller 6 may determine whether at least a portion of the heater-side passage 16 is opened (S6). When it is determined that at least a portion of the heater-side passage 16 is opened by the temperature door 26, the controller 6 may control the second actuator M2 so that the temperature door 26 may fully open the bypass passage 17 and fully close the heater-side passage 16 (S7). Accordingly, the indoor air having passed through the evaporator 21 may only be directed into the bypass passage 17, bypassing the heater core 25. Thus, the indoor air may be prevented from being heated by the heater core 25.

Referring to FIG. 3, the controller 6 may determine whether the second voltage $V_2$ applied to the second actuator M2 is higher than the second minimum voltage $V_{min2}$ and lower than or equal to the second maximum voltage $V_{max2}$ ($V_{min2} < V_2 \leq V_{max2}$) (S6-1). When it is determined that the second voltage $V_2$ applied to the second actuator M2 is higher than the second minimum voltage $V_{min2}$ and lower than or equal to the second maximum voltage $V_{max2}$ ($V_{min2} < V_2 \leq V_{max2}$), the controller 6 may set the second voltage $V_2$ to the second minimum voltage $V_{min2}$ (S7-1). When the second voltage $V_2$ is set to the second minimum voltage $V_{min2}$, the temperature door 26 may move to the first operating position. Accordingly, the heater-side passage 16 may be fully closed and the bypass passage 17 may be fully opened. Thus, the indoor air having passed through the evaporator 21 may only be directed into the bypass passage 17.

When it is determined that the heater-side passage 16 is not opened, the controller 6 may determine whether the flow rate of the air blown by the air blower 27 is higher than or equal to a reference flow rate (S8). When it is determined that the flow rate of the indoor air is higher than or equal to the reference flow rate, the controller 6 may set the flow rate of the air blown by the air blower 27 to a minimum flow rate (S9). Here, the reference flow rate may be an air flow rate allowing the temperature of the evaporator 21 to rise to a limit temperature TL within a reference time when the compressor 22 is stopped, and the limit temperature TL may be a temperature of the evaporator 21 allowing the engine 1 to be restarted by the ISG system 5.

That is, when the flow rate of the indoor air blown by the air blower 27 reaches the reference flow rate, the temperature of the evaporator 21 may rise to the limit temperature, and when the temperature of the evaporator 21 rises to the limit temperature, the engine 1 may be automatically restarted by the ISG system. As the flow rate of the air blown by the air blower 27 is maintained at the minimum flow rate, the cooling performance of the HVAC system 10 may be relatively low in a state in which the compressor 22 is stopped, while the cooling operation time of the HVAC system 10 may be relatively increased.

Referring to FIG. 3, the controller 6 may determine whether the third voltage $V_3$ applied to the air blower 27 is higher than or equal to a reference voltage $V_R$ ($V_3 \geq V_R$) (S8-1). The reference voltage $V_R$ may be a voltage corresponding to the reference flow rate. That is, when the third voltage $V_3$ is the reference voltage $V_R$, the flow rate of the air blown by the air blower 27 may be the reference flow rate. When the third voltage $V_3$ applied to the air blower 27 is higher than or equal to the reference voltage $V_R$, the controller 6 may subtract a predetermined voltage $V_I$ from the third voltage $V_3$ (S9-1), and determine whether the third voltage $V_3$ is equal to the third minimum voltage $V_{min3}$ (S9-2). That is, the controller 6 may repeat subtracting the predetermined voltage $V_I$ from the third voltage $V_3$ until the third voltage $V_3$ is set to the third minimum voltage $V_{min3}$. For example, the predetermined reduced voltage $V_I$ may be 2V. The controller 6 may determine whether the third voltage $V_3$ applied to the air blower 27 is higher than or equal to the third minimum voltage $V_{min3}$ and lower than the reference voltage $V_R$ (S8-2). When the third voltage $V_3$ is higher than or equal to the third minimum voltage $V_{min3}$ and lower than the reference voltage $V_R$, the controller 6 may set the third voltage $V_3$ to the third minimum voltage $V_{min3}$ (S9-3). When the third voltage $V_3$ is the third minimum voltage $V_{min3}$, the RPM of the air blower 27 may be a minimum RPM, and accordingly the flow rate of the air blown into the housing 11 by the air blower 27 may be maintained at the minimum flow rate.

Figure 4:
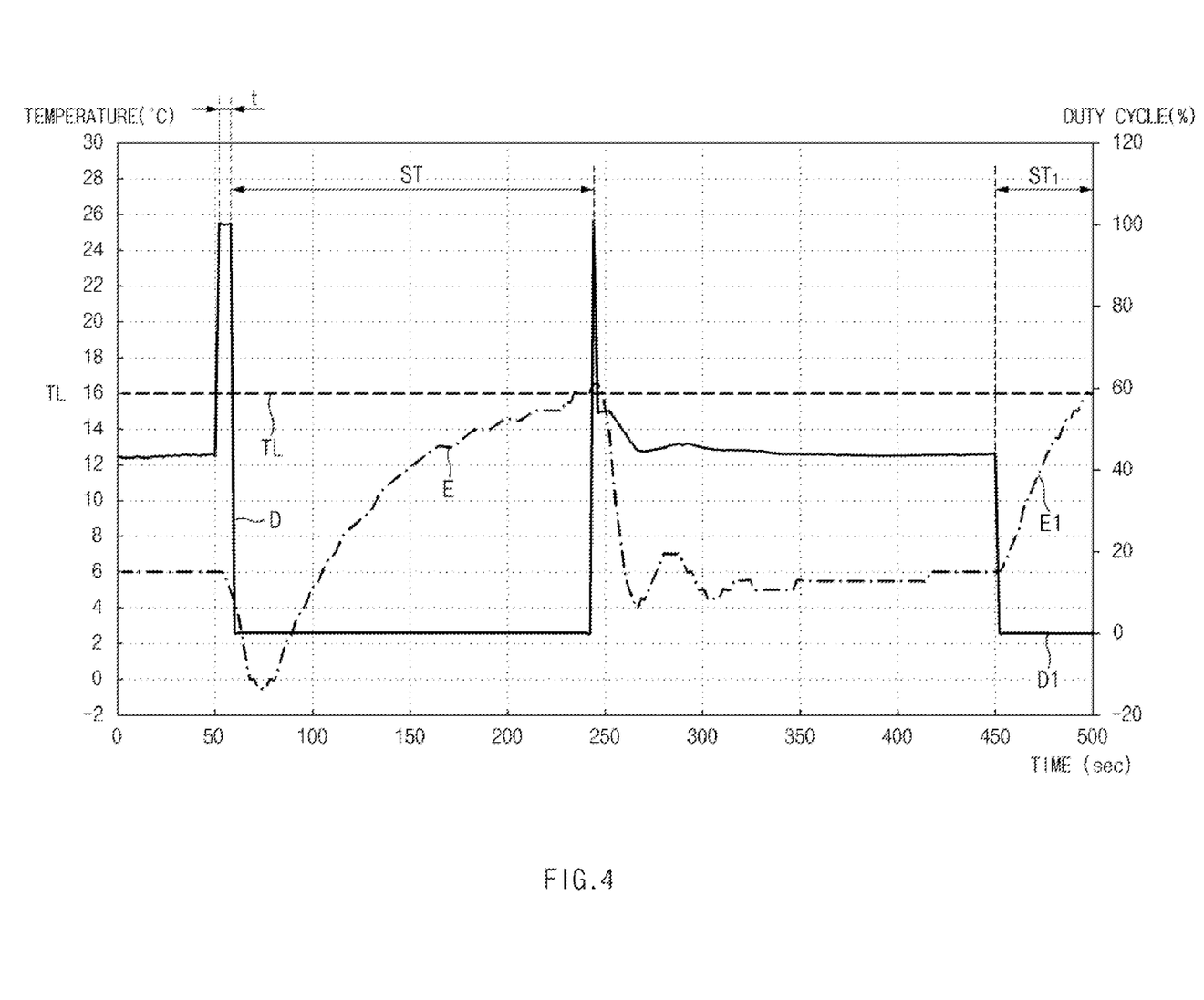
FIG. 4 illustrates a graph of a duty cycle of a compressor and a temperature of an evaporator when an engine is stopped or restarted by an ISG system.

Referring to FIG. 4, a duty cycle D of the compressor 22 is set to 100% for a predetermined time period and thereafter, as the engine 1 is stopped by the ISG system 5, the duty cycle D of the compressor 22 may be maintained at 0%. In in the instant state, as illustrated in FIG. 2 and FIG. 3, only the indoor air may be directed into the housing 11 of the HVAC system 10, and the indoor air directed into the housing 11 may bypass the heater core 25. By maintaining the flow rate of the air blown by the air blower 27 at the minimum flow rate, a temperature E of the evaporator 21 may rapidly decrease, and then may gradually increase to the limit temperature TL (e.g., 16° C.). Accordingly, a stop time ST of the engine 1 stopped by the ISG system 5 may be maintained for a relatively long time (e.g., 160 seconds).

On the other hand, when the engine 1 is suddenly stopped by the ISG system 5 in a state in which the HVAC system 10 is operating in the cooling mode, the compressor 22 may be stopped, and accordingly a duty cycle D1 of the compressor 22 may change to 0%. A temperature E1 of the evaporator 21 may sharply rise to the limit temperature TL, and accordingly a stop time ST1 of the engine 1 stopped by the ISG system 5 may be maintained for a relatively short time period (e.g., 50 seconds).

As set forth above, according to exemplary embodiments of the present invention, by minimizing the cooling performance of the HVAC system in a state in which the HVAC system operates in the cooling mode and the engine is stopped by the ISG system, the evaporator temperature may be prevented from rising rapidly. Accordingly, the stop time of the engine stopped by the ISG system may be maintained for a relatively long time, and thus fuel efficiency may be improved.

According to exemplary embodiments of the present invention, the cooling operation of the HVAC system may be performed with the minimum flow rate even in a state in which the engine is stopped by the ISG system in summer. Thus, indoor cooling in the passenger compartment may be kept constant, and a bad smell in the HVAC system may be prevented.

According to exemplary embodiments of the present invention, the stop time of the engine stopped by the ISG system may be relatively extended without additional cost increase, and thus the quality of the ISG system and the HVAC system may be improved.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a heating, ventilation, and air conditioning (HVAC) system including a housing having an outdoor air inlet through which outdoor air is allowed to draw in and an indoor air inlet through which indoor air of a vehicle is allowed to draw in, an inlet door for opening or closing the outdoor air inlet and the indoor air inlet, an evaporator mounted in the housing, a compressor fluidically connected to the evaporator, a heater-side passage and a bypass passage formed in parallel in the housing on a downstream of the evaporator, a heater core mounted within the heater-side passage, a temperature door pivotally mounted between the heater-side passage and the bypass passage and configured for opening or closing the heater-side passage and the bypass passage, and an air blower blowing air into the housing, the method comprising:
    setting, by a controller, a duty cycle of the compressor to 100% for a predetermined time period based on a stop signal of an engine received from an Idle Stop and Go (ISG) system;
    controlling, by the controller, the ISG system to stop the engine;
    allowing, by the controller, only the indoor air to be directed into the housing by controlling the inlet door, in response that the HVAC system operates in a cooling mode and the engine is stopped by the ISG system;
    allowing, by the controller, the indoor air directed into the housing to bypass the heater core, by controlling the temperature door; and
    maintaining, by the controller, a flow rate of the air directed into the housing at a minimum flow rate, by controlling the air blower.

2. The method according to claim 1, further including:
allowing, by the controller, only the indoor air to be directed into the housing by controlling the inlet door to fully close the outdoor air inlet and fully open the indoor air inlet in response that the controller determines that the outdoor air is directed into the housing.

3. The method according to claim 1,
    wherein the HVAC system includes a first actuator coupled to the inlet door and electrically connected to the controller, and the first actuator is configured for operating the inlet door by the controller,
    wherein the inlet door is configured to move between a first open position in which the outdoor air inlet is fully opened and the indoor air inlet is fully closed and a second open position in which the outdoor air inlet is fully closed and the indoor air inlet is fully opened,
    wherein in response that a first voltage applied to the first actuator is a first minimum voltage, the inlet door is configured to move to the first open position, and
    wherein in response that the first voltage is a first maximum voltage, the inlet door is configured to move to the second open position.

4. The method according to claim 3, further including:
setting, by the controller, the first voltage to the first maximum voltage in response that the first voltage is higher than or equal to the first minimum voltage and lower than the first maximum voltage.

5. The method according to claim 1, further including:
allowing, by the controller, the indoor air directed into the housing to bypass the heater core by controlling the temperature door to fully open the bypass passage and fully close the heater-side passage in response that at least a portion of the heater-side passage is opened.

6. The method according to claim 1,
    wherein the HVAC system further includes a second actuator coupled to the temperature door and electrically connected to the controller, and the second actuator is configured to operate the temperature door by the controller,
    wherein the temperature door is configured to move between a first operating position in which the heater-side passage is fully closed and the bypass passage is fully opened and a second operating position in which the heater-side passage is fully opened and the bypass passage is fully closed,
    wherein in response that a second voltage applied to the second actuator is a second minimum voltage, the temperature door is configured to move to the first operating position, and
    wherein in response that the second voltage is a second maximum voltage, the temperature door is configured to move to the second operating position.

7. The method according to claim 6, further including:
setting, by the controller, the second voltage to the second minimum voltage in response that the second voltage is higher than the second minimum voltage and lower than or equal to the second maximum voltage.

8. The method according to claim 1, wherein the HVAC system further includes the compressor fluidically connected to the evaporator, and the method further includes:
    setting, by the controller, the flow rate of the air blown by the air blower electrically connected to the controller, to the minimum flow rate in response that the controller determines that the flow rate of the air blown by the air blower is higher than or equal to a reference flow rate, wherein the reference flow rate is an air flow rate allowing a temperature of the evaporator to rise to a limit temperature within a reference time in response that the compressor is stopped, and wherein the limit temperature is a temperature of the evaporator allowing the engine to be restarted by the ISG system.

9. The method according to claim 8, wherein the flow rate of the air blown into the housing by the air blower becomes the minimum flow rate in response that a third voltage applied to the air blower is a third minimum voltage, and wherein the flow rate of the air blown into the housing by the air blower becomes a maximum flow rate in response that the third voltage is a third maximum voltage.

10. The method according to claim 9, further including:

determining, by the controller, whether the third voltage is higher than or equal to a reference voltage, and in response that the controller determines that the third voltage is higher than or equal to the reference voltage, the controller is configured to subtract a predetermined voltage from the third voltage until the third voltage is set to the third minimum voltage, wherein the reference voltage is a voltage corresponding to the reference flow rate.

11. The method according to claim 10, further including:

setting, by the controller, the third voltage to the third minimum voltage in response that the third voltage is higher than or equal to the third minimum voltage and lower than the reference voltage.

* * * * *